United States Patent [19]

Sutherland

[11] Patent Number: 4,498,890
[45] Date of Patent: Feb. 12, 1985

[54] FIXED TRACK CHAIN DRIVE

[75] Inventor: George H. Sutherland, Richmond Heights, Ohio

[73] Assignee: General Electric Company, Schenectady, N.Y.

[21] Appl. No.: 450,854

[22] Filed: Dec. 20, 1982

[51] Int. Cl.³ .............................................. F16H 7/18
[52] U.S. Cl. .................................... 474/140; 74/89.21
[58] Field of Search ................ 474/140, 111, 144–147; 226/196; 30/382; 74/89.21

[56] References Cited

U.S. PATENT DOCUMENTS 2,599,608  6/1952  Bye ................................... 474/140 X
2,768,734  10/1956 Klinzing ........................... 474/140 X
4,311,225  1/1982  Tsubaki et al. ................ 74/89.21 X

OTHER PUBLICATIONS

"Fundamentals of Mechanical Design", McGraw-Hill, (1970), pp. 338–347.

"Mechanical Engineering", McGraw-Hill, (1977), pp. 564–570.

"Guidance of a Rigid Body in a Fixed Track", Freudenstein et al., Transactions of the ASME, May 1973, pp. 558–562.

Primary Examiner—George A. Suchfield
Assistant Examiner—Thuy M. Bui
Attorney, Agent, or Firm—John F. McDevitt; Philip L. Schlamp; Fred Jacob

[57] ABSTRACT

Guide means are provided for a fixed track chain drive system to avoid velocity fluctuation caused when the chain enters and exits a drive sprocket during continued travel between straight tracks. Said guide means comprises a curved track section located between the drive sprocket and straight track having a varying curvature depending upon a mathematical computation derived between the chain lengths when traveling in the straight track and on the drive sprocket.

9 Claims, 5 Drawing Figures

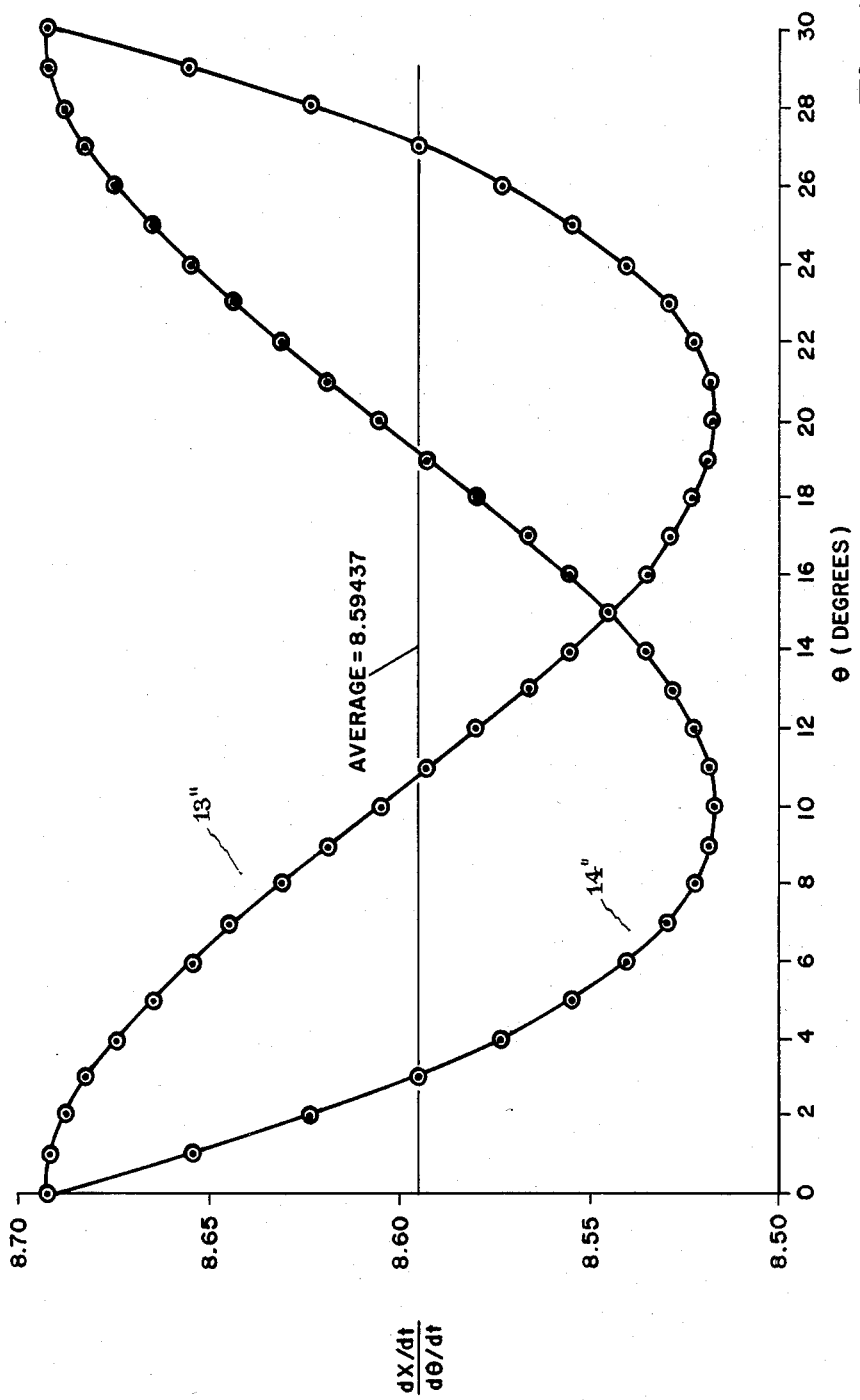

FIXED TRACK CHAIN DRIVE

BACKGROUND OF THE INVENTION

The term "chordal speed variation" has long been used to define certain velocity fluctuations observed when a chain is being driven between a pair of sprocket members. Such velocity fluctuations produce spatial positioning errors which are further recognized to depend upon the number of teeth in the drive sprocket and which can be partly reduced by using an odd number of drive teeth. Chain drives are also known for use on various types of "in-line" manufacturing equipment and where parts can be assembled together while both traveling in the same direction. Understandably, the recognized velocity fluctuations promote misalignment and lack of registration between parts being assembled together in this manner and which is especially undesirable for the higher manufacturing speeds constantly being sought.

Roller chain drives wherein the rollers are guided in a pair of straight track sections that extend between the drive and driven sprockets in order to maintain an equal spacing over both chain spans provides still another known means to reduce undesired physical displacement of the chain and any members fixed thereto during its travel between the sprocket members. Such roller chain drives do not avoid the aforementioned velocity fluctuations, however, since the travel speed of the chain link on the straight track is not equal to its travel speed on the drive sprocket. Accordingly, it would be further desirable to modify such fixed track chain drives in a manner retaining the performance advantages achieved with such drive systems while reducing the speed or velocity fluctuations between the fixed track and sprocket components in said drive systems. It would be still further desirable to do so in a manner not requiring either a major structural redesign of the existing fixed track chain drive systems or which produces any accompanying operational impairment.

SUMMARY OF THE INVENTION

It has now been discovered that a curved track section of proper curvature which is located between the drive sprocket and the straight track section in a fixed track chain drive can avoid velocity fluctuations caused when the chain enters and exits said drive sprocket during its continuous travel. More particularly, said compensation requires locating a curved track section of varying curvature between said drive sprocket and the straight track section, said curved track section having a projected length approximately equal to the length of a chain link and with said varying curvature being defined by a depth from said projected length approximately equal to the locus of intersection between two circles each having a radius equal to the length of said chain link and with centers being located by adjacent pins in said chain link. The depth of said varying curvature can further depend on the relative location of said curved track section with respect to said drive sprocket and said straight track section. For drive embodiments having curved track sections at both entrance and exit locations adjacent said drive sprocket, there is a still further requirement that each curved track section have a different albeit related curvature. In the preferred chain drive embodiments, opposing track members are also provided to guide the chain rollers therebetween with the curved track sections utilizing male and female type half-sections for this purpose.

An especially preferred guidance system of the present invention includes:

(a) a drive sprocket having a pitch radius suitable for engagement of a roller chain, (b) a driven sproket spaced apart from said drive sprocket in the form of a smooth drum having a radius less than said pitch radius by an amount approximately equal to the radius of the roller elements in said roller chain, (c) straight track sections extending between said spaced apart drive and driven sprockets such that the roller chain is guided at approximate equal spacing over the chain span, and (d) a pair of curved track sections located between said drive sprocket and said straight track sections, each of said curved track sections having a projected length approximately equal to the length of a chain link with varying curvatures of different depth from said projected length approximately equal to the locus of intersection between two circles each having a radius equal to the length of a chain link with the centers being located by adjacent pins.

As previously indicated, the depth of said varying curvature for the curved track sections in said above especially preferred embodiment again depends on the relative location of the curved track sections with respect to said drive sprocket. A second pair of curved track sections can also be utilized in said especially preferred drive system embodiment to still further reduce the velocity fluctuation and which are located between the driven sprocket and adjoining straight track sections. The depth of curvature for said second pair of curved track sections is made equal to the depths of said first pair of curved track sections on the same side of said roller chain.

BRIEF DESCRIPTION OF THE DRAWINGS

FIG. 3 is another graph depicting computation of the varying curvature track employed in accordance with the present invention;

DESCRIPTION OF THE PREFERRED EMBODIMENTS

Figure 1:
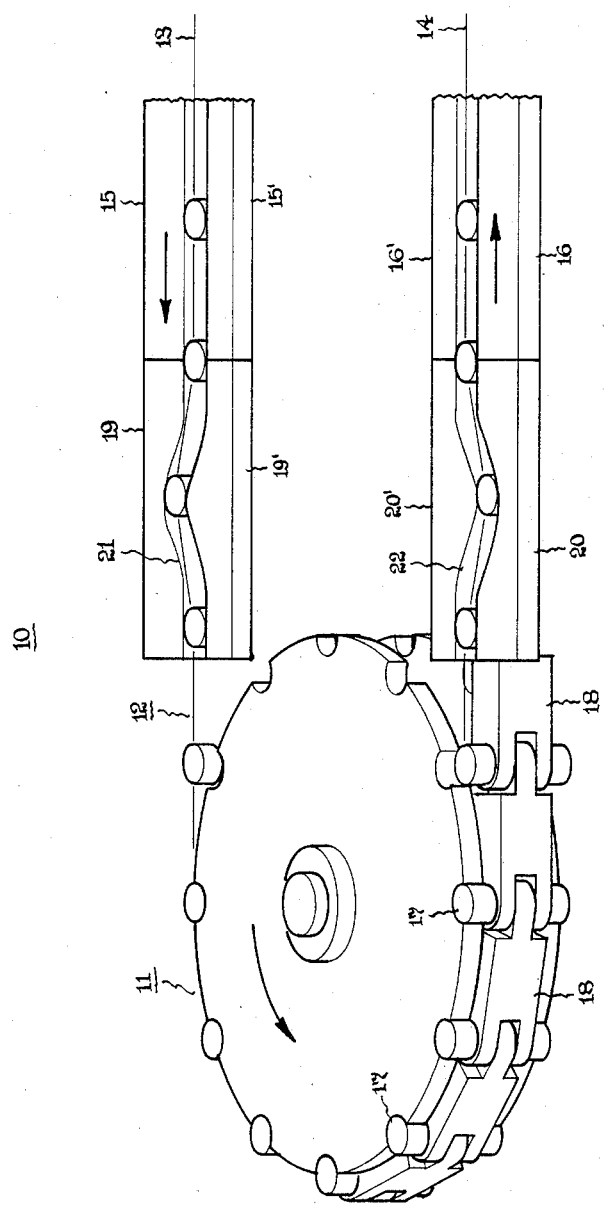
FIG. 1 is a perspective view depicting representative guidance means of the present invention as employed in connection with a drive sprocket in a fixed track roller chain drive system.

Referring to FIG. 1, there is depicted a representative fixed track roller chain drive system 10 incorporating the particular compensation means of the present invention which includes a sprocket member 11 of twelve tooth configuration driving a 108-link roller chain member 12 having a 4.5 inch pitch distance. A driven sprocket member (not shown) comprises a smooth drum of radius such that the chain roller radius plus drum radius equals the pitch radius of said drive sprocket member 11. Said roller chain member 12 is guided along both spans 13 and 14 by straight track members 15 and 16 (respectively) so that the two spans are always a drum diameter apart from each other. Each pair of said roller members 17 are physically connected by a link element 18 in the conventional manner and with the distance between said roller chains constituting the pitch length of said roller chain. A pair of curved track sections 19 and 20 are physically located adjacent the entrance and exit teeth of said drive sprocket member 11 to provide the means for correcting certain velocity fluctuations which occur during chain travel over its entire path length. As previously indicated, said curved track sections compensate for the different roller speeds otherwise encountered during travel in the fixed tracks as compared with the travel speed of said rollers when physically engaged by said sprocket member 11. Curved track sections 19 and 20 include varying curvature track paths 21 and 22, respectively, as the structural means for providing the desired velocity compensation. As can be further noted from said drawing, each of the straight track constructions 15 and 16 as well as the curved track constructions 19 and 20 are formed in opposing half sections (depicted by corresponding prime numerals in the drawing) to secure the roller members therebetween during passage through all track sections. For this purpose, the half section parts of curved track members 19 and 20 provide male and female engagement at the curvature portions. The varying curvature for each of said curved track members 19 and 20 is computed according to the present invention by means of a mathematical relationship described hereinafter. Before proceeding with said description, however, it should be recognized that still another position error otherwise occurring in the above described drive system embodiment can be reduced by adding one more link to the chain member. Specifically, center distance fluctuations between the drive and sprockets will be reduced in this manner with 109 links in said chain member from a calculated value of approximately 0.019 inch to about only 0.001 inch.

Figure 2:
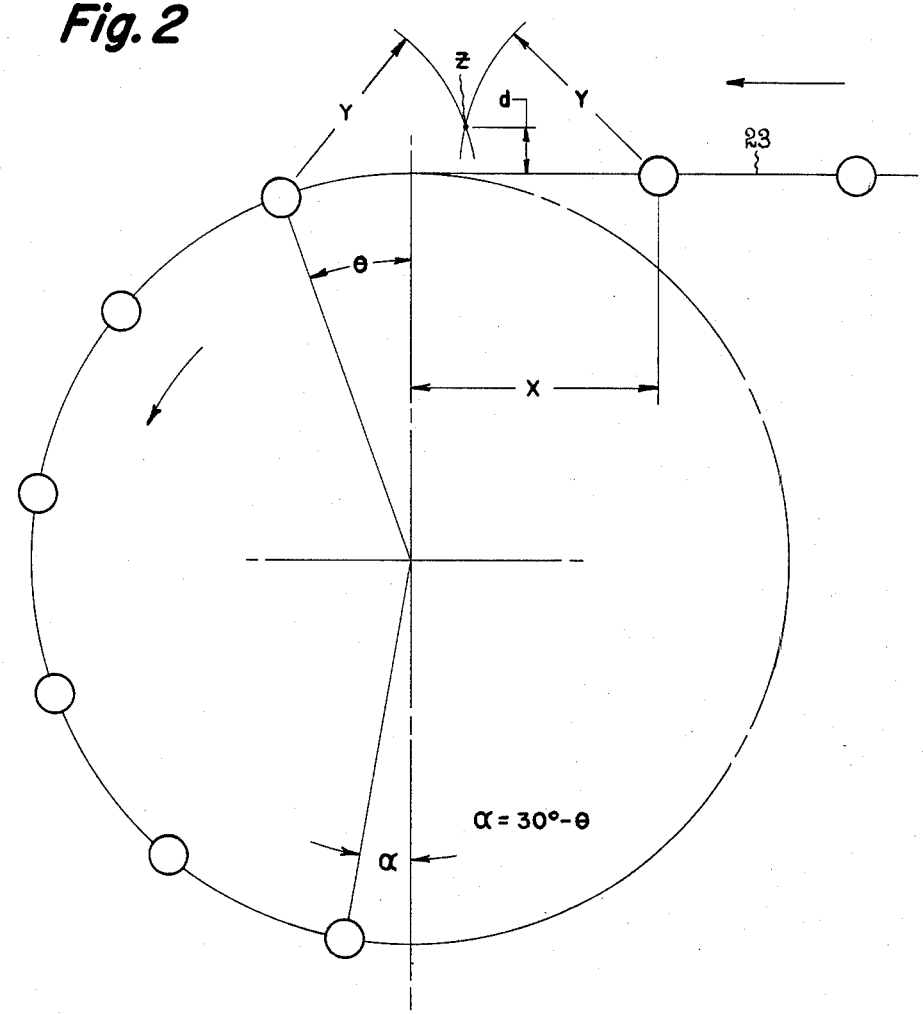
FIG. 2 is a graph depicting the general mathematical relationship for the compensation of velocity fluctuations according to the present invention.

In FIG. 2, there is shown a kinematic graph model for the chain link positions when first engaged by the drive sprocket member in the above described drive system embodiment. A mathematical relationship is derived from said graph expressing the position error for a chain link due to the aforementioned velocity fluctuations. Accordingly, the position "x" of said chain link in link span 13 when first engaged by drive sprocket 11 is mathematically derived to be as follows:

$$x = p \cos(\phi) - r \sin(\theta)$$

where $\theta = \sin^{-1}\{[1 - \cos(\theta)]r/p\}$.

If said chain link moved at a constant speed during engagement by said drive sprocket member, then the position of said link during said travel is further derived to be as follows:

$$x' = 4.5 (\pi/6 - \theta)/(\pi/6)$$
$$= 4.5 (\pi - 6\theta)/\pi$$

where $\theta$ is measured in radians.

Both above "x" and "x'" position equations apply during sprocket rotation angles $\theta$ which vary between 0 and 30 degrees due to the number of drive sprockets in the illustrated drive system embodiment. As a result, when said representative link moves to the next tooth element on said drive sprocket, there will be a repetition of the 0° positions taking place. The link position error during said travel movement is found to be as follows:

$$e_x = x - x'$$

Corresponding position error relationships for the chain links in span 14 are derived from said above mathematical expressions with angle $\alpha$ being equal to 30° minus $\theta$ as for example, if $\theta = 5°$ then $\alpha$ equals 25°. The "Y" designations shown in FIG. 2 each represent the pitch length (4.5 inches) between individual links of chain span 13 in the roller chain drive being illustrated. Said designations further define the radii of circles drawn through the center points of the depicted chain links. The "Z" point of intersection between these circles represents a point on the curvature profile of the curved track section 19 which corrects for the position error between said links with respect to a point on the chain track center line. Said position error point Z is spatially removed from said chain track center line 23 by a distance "d" as shown on said graph. Accordingly, the locus of said position error points for all intermediate positions between the illustrated links establishes the varying curvature path for said track center line in order to provide the correction when further defined as a function of the sprocket rotation angle $\theta$.

FIG. 3 is another graph plotted from the above described position error relationships with curve 13" representing the position errors for chain span 13 while curve 14" represents the same relationships for chain span 14 in the above illustrated drive system embodiment. The varying curvature in the respective curve track sections 19 and 20, respectively, are next derived from said position error information using the average 8.59437 value provided in said graph to determine the points at which said compensation will take place. More particularly, the curved track compensation for chain span 13 will commence at a angle of 10.858° whereas curved track compensation for chain span 14 has its starting point at a $\theta$ angle of 19.142°. Said average value shown in FIG. 3 for this purpose is computed from the "x'" equation given above while the derivation of both curves 13 and 14 requires utilization of still further mathematical relationships. The equation defining curve 13 is as follows:

$$\frac{dx}{dt} = \frac{-d\theta}{dt} \{r[\cos(\theta) + \sin(\theta)\tan(\phi)]\}$$

It will be recognized from said above mathematical expression that the relationship $d\theta/dt$ varies as the reciprocal of the term expressed by braces in said equation. The corresponding mathematical expression for curve 14 is as follows:

$$\frac{dx}{dt} = \frac{d\theta}{dt}\left\{ \frac{r}{2} [\sqrt{3}\cos(\theta) + \sin(\theta) + [\cos(\theta) - \sqrt{3}\sin(\theta)]\tan(\phi')] \right\}$$

where $\phi' = \sin^{-1}\{[2 - (\sqrt{3}\cos(\theta) + \sin\theta)]\pi r/2p\}$.

It will be noted that the expression in braces for said curve 13" relationship is not the same as the expression in braces for the curve 14" equation. Said differences point out the need for a different curvature path in each of the curved track sections 19 and 20 to compensate for these overall chain travel velocity fluctuations. On the other hand, curves 13" and 14" can be noted from said FIG. 3 graph to have a "mirror image" relationship attributable to the complementary nature of angles $\theta$ and $\alpha$. Said relationship enables the curvature paths in each of said tracks to be formed in a corresponding fashion while track substitution can also take place if the remaining structure permits.

Figure 4:
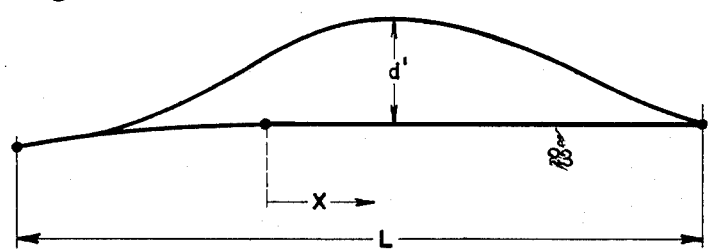
FIG. 4 is a profile of the varied curvature obtained from said FIG. 3 embodiment.

In FIG. 4 there is shown a profile of the varying curvature path used for compensation in curved track section 19. More particularly, a projected length (L) of said curve path in the direction of the straight track travel is computed to be a value of 4.4973 from the information given in preceding FIG. 3 which closely approximates the value of the chain link distance in the illustrated drive system embodiment. The maximum depth "d'" for said curvature path is likewise computed from the curve 13" information given in FIG. 3 to be 0.0676 inches and with said maximum deviation occurring at the angle $\theta$ value of 24°. In deriving the foregoing graphical computation of the curved track profiles being used for compensation in accordance with the present invention, it will be appreciated that a second pair of curved track sections having the same curvatures can also be added adjacent the entrance and exit locations for the driven sprocket member in the illustrated drive system embodiment. Specifically, such additional compensation means will still further reduce the overall velocity fluctuations being encountered in large size equipment operating at high speeds. As a combined result of said varying curvature paths, there is produced a constant speed of travel in all straight track sections of the present chain drive for a constant rotational speed of the drive sprocket.

Figure 5:
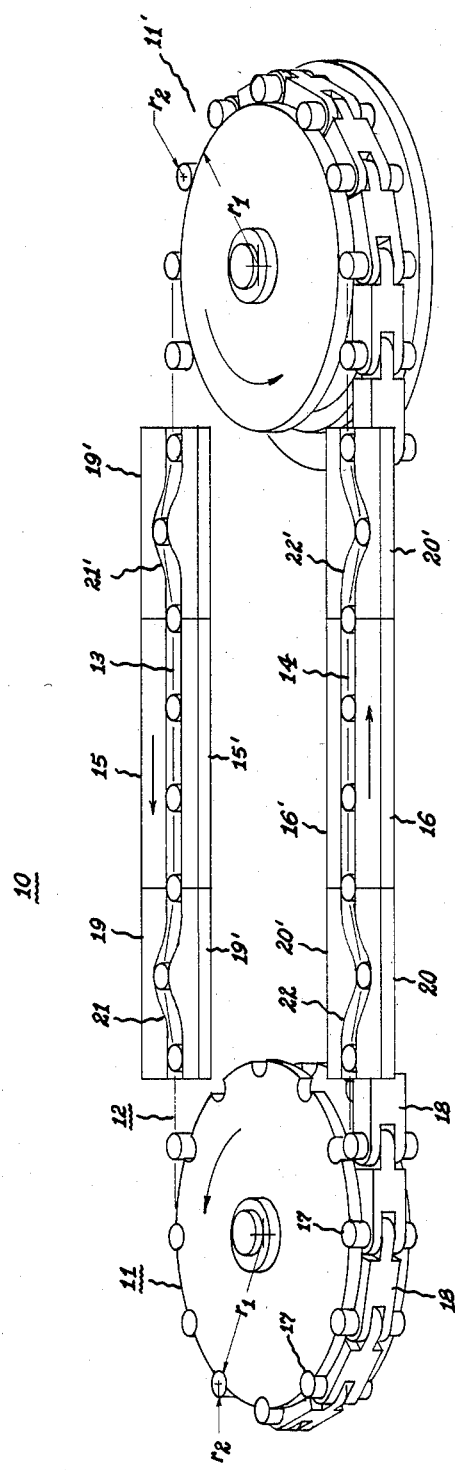
FIG. 5 is a perspective view depicting an entire roller chain drive system according to the present invention.

FIG. 5 depicts an entire roller chain drive system utilizing the previously described velocity compensation means. Specifically fixed track roller chain drive system 10 includes drive sprocket member 10 having a effective radius "$r_1$", which drives roller chain member 12 having a roller radius "$r_2$" to provide a pitch radius equal to r, $+r_2$. A driven sprocket member 11' in the form of a smooth drum having the same effective radius "$r_1$" is operatively associated with the drive sprocket member as previously described and depicted in the present drawing. Said roller chain member 12 is guided along both spans 13 and 14 by straight track sections 14 and 15, respectively, so that the two spans are always a drum diameter apart from each other. Again, as hereinbefore described in connection with said FIG. 1 drive system embodiment, each pair of roller members 17 in the roller chain member 12 are connected by a link element 18 so that the distance between said rollers constitutes the pitch length of said roller chain and a pair of curved track sections 19 and 20 that are located at the entrance and exit to said drive sprocket member 11 provide compensation for the otherwise existing velocity fluctuations during chain travel. A second pair of curved track sections 19' and 20' are also provided in the present embodiment adjacent the entrance and exit to driven sprocket member 11' for additional velocity compensation and with the curvature paths in said curved track sections again having the same mirror image relationship previously described in connection with the FIG. 1 drive system embodiment. Accordingly, the curvature paths 21 and 22 as well as the curvature paths 21' and 22' in the present drive system embodiment share a related curvature wherein the curvature paths 21 and 22' are identical to each other while the curvature paths 21' and 22 are also identical to each other.

It will be apparent from the foregoing description that an improved fixed track chain drive system has been provided which is significantly less prone to certain velocity fluctuations otherwise experienced due to inherent operational characteristics of the chain member. It will be apparent to those ordinarily skilled in the art, however, that still further modifications can be made within the spirit and scope of the present invention. For example, while the present improvement has been illustrated for a drive system being operated in a horizontal plane, it will be recognized that the same improvement is obtained regardless of spatial orientation for said drive system. Additionally, it will also be recognized that the present improvement provides comparable advantages when used other than with manufacturing equipment. It is thereby intended to limit the present invention, therefore, only by the scope of the following claims.

What I claim as new and desire to secure by Letters Patent of the United States is:

1. A guidance system to avoid velocity fluctuation in a fixed track chain drive caused when the chain enters and exits a drive sprocket during continued travel between straight tracks which comprises locating a pair of curved track sections between said drive sprocket and said straight tracks having different curvature paths, said curved track sections having a projected length approximately equal to the length of a chain link and with a varying curvature being defined by a depth from said projected length approximately equal to the locus of intersection between two circles each having a radius equal to the length of a chain link and with centers being located by adjacent pins, and with the curvature path in each of said curved track sections having a mirror image relationship with the other curvature path.

2. A guidance system as in claim 1 wherein the depth of said varying curvature depends on the relative location of said curved track section with respect to said drive sprocket.

3. A guidance system as in claim 1 wherein the drive sprocket has an even number of teeth.

4. A guidance system as in claim 1 wherein the drive sprocket has an uneven number of teeth.

5. A guidance system to avoid velocity fluctuations in a fixed track roller chain drive caused when the chain enters and exits a drive sprocket during continued travel between straight tracks which comprises:
(a) a drive sprocket having a pitch radius suitable for engagement of the roller elements in said roller chain,
(b) a driven sprocket spaced apart from said drive sprocket in the form of a smooth drum having a radius less than said pitch radius by an amount approximately equal to the radius of the roller elements in said roller chain,
(c) straight track sections extending between said spaced apart drive and driven sprockets such that the roller chain is guided at approximately equal spacing over the chain span, and
(d) a pair of curved track sections located between said drive sprocket and said straight track sections having different curvature paths, each of said curved track sections having a projected length approximately equal to the length of a chain link with varying curvatures of different depth from said projected length approximately equal to the locus of intersection between two circles each having a radius equal to the length of a chain link and with the centers being located by adjacent pins and with the curvature path in each of said curved track sections having a mirror image relationship with the other curvature path.

6. A guidance system as in claim 5 wherein the depth of said varying curvature depends on the relative location of said curved track sections with respect to said drive sprocket.

7. A guidance system as in claim 5 which further includes a second pair of curved track sections located between said driven sprocket and said straight track sections having depths equal to the depths of the first pair of curved track sections on the same side of said roller chain.

8. A guidance system as in claim 7 wherein the depth of said varying curvature depends on the relative location of said curved track sections with respect to said driven sprocket.

9. A guidance system as in claim 5 wherein the drive sprocket has an even number of teeth.

* * * * *